US009459855B2

(12) United States Patent
Hanes et al.

(10) Patent No.: US 9,459,855 B2
(45) Date of Patent: Oct. 4, 2016

(54) SYSTEM AND METHOD FOR INFORMATION HANDLING SYSTEM IMAGE NETWORK COMMUNICATION

(71) Applicant: Dell Products L.P., Round Rock, TX (US)

(72) Inventors: Kevin Hanes, Round Rock, TX (US); Tim W. Cox, Austin, TX (US); Marc Jarvis, Belton, TX (US); Chandar Kamalanathan, Austin, TX (US)

(73) Assignee: DELL PRODUCTS L.P., Round Rock, TX (US)

(*) Notice: Subject to any disclaimer, the term of this patent is extended or adjusted under 35 U.S.C. 154(b) by 85 days.

(21) Appl. No.: 14/593,520

(22) Filed: Jan. 9, 2015

(65) Prior Publication Data

US 2015/0121362 A1    Apr. 30, 2015

Related U.S. Application Data

(63) Continuation of application No. 10/979,632, filed on Nov. 2, 2004, now Pat. No. 8,972,545.

(51) Int. Cl.
*G06F 15/177*   (2006.01)
*G06F 9/445*   (2006.01)
*H04L 29/08*   (2006.01)

(52) U.S. Cl.
CPC ............... *G06F 8/63* (2013.01); *H04L 67/12* (2013.01); *H04L 67/34* (2013.01)

(58) Field of Classification Search
CPC ............ G06F 8/63; G06F 9/24; H04L 67/12

USPC ........................................................ 709/222
See application file for complete search history.

(56) References Cited

U.S. PATENT DOCUMENTS 5,692,190 A     11/1997  Williams
5,754,190 A  *   5/1998  Dutton ................... G06T 9/001
                                                        345/473

(Continued)

FOREIGN PATENT DOCUMENTS

DE         10352811 A1     6/2005
EP          1443398 A2     1/2004

(Continued)

OTHER PUBLICATIONS

McBrearty, G.F., IBM Technical Disclosure Bulletin, Method for Software Installation and Apply Once Update From a Single Image, vol. 38, No. 11, Nov. 1995.

*Primary Examiner* — Anthony Mejia
(74) *Attorney, Agent, or Firm* — Terrile, Cannatti, Chambers & Holland, LLP; Robert W. Holland

(57) ABSTRACT

A system and method for information handling system manufacture analyzes an image to determine a traits definition that identifies the operating system, applications and unique information of the image, such as in a XML file. The image traits definition may be communicated to a manufacture site over a network and used to re-create the image for copying to a manufactured information handling system. Communication of the image traits definition consumes less network and storage resources than communication of the image, thus reducing the time and expense of image transfers to manufacture information handling systems.

20 Claims, 4 Drawing Sheets

(56) References Cited

U.S. PATENT DOCUMENTS

| | | | |
|---|---|---|---|
| 5,995,757 A | 11/1999 | Amberg et al. | |
| 6,080,207 A | 6/2000 | Kroening et al. | |
| 6,178,546 B1 | 1/2001 | McIntyre | |
| 6,182,275 B1 | 1/2001 | Beelitz et al. | |
| 6,247,128 B1* | 6/2001 | Fisher | G06F 8/63 713/1 |
| 6,282,711 B1 | 8/2001 | Halpern et al. | |
| 6,301,707 B1 | 10/2001 | Carroll et al. | |
| 6,505,094 B2 | 1/2003 | Pape et al. | |
| 6,658,563 B1 | 12/2003 | Ice et al. | |
| 6,690,984 B1 | 2/2004 | Thrift et al. | |
| 6,714,937 B1 | 3/2004 | Eynon et al. | |
| 6,775,829 B1 | 8/2004 | Kroening | |
| 6,789,109 B2 | 9/2004 | Samra et al. | |
| 6,823,508 B1 | 11/2004 | Burkhardt et al. | |
| 6,928,644 B1 | 8/2005 | Kroening et al. | |
| 7,010,144 B1 | 3/2006 | Davis et al. | |
| 7,032,011 B2 | 4/2006 | Woodard et al. | |
| 7,117,256 B1* | 10/2006 | Blinn | H04N 21/4122 375/E7.011 |
| 7,356,679 B1* | 4/2008 | Le | G06F 17/30067 707/E17.01 |
| 7,392,309 B2 | 6/2008 | Childers et al. | |
| 7,620,737 B2 | 11/2009 | Newman et al. | |
| 7,774,369 B2* | 8/2010 | Herzog | G06Q 10/10 707/793 |
| 2002/0112232 A1 | 8/2002 | Ream et al. | |
| 2002/0124245 A1 | 9/2002 | Maddux et al. | |
| 2003/0030664 A1 | 2/2003 | Parry | |
| 2003/0097427 A1 | 5/2003 | Parry | |
| 2003/0163809 A1 | 8/2003 | Bantz | |
| 2003/0220944 A1 | 11/2003 | Lyman Schottland et al. | |
| 2004/0006689 A1 | 1/2004 | Miller et al. | |
| 2004/0015536 A1 | 1/2004 | Cohen et al. | |
| 2004/0025155 A1 | 2/2004 | Sedlack et al. | |
| 2004/0083450 A1 | 4/2004 | Porkka | |
| 2004/0148601 A1* | 7/2004 | Kroening | G06F 8/61 717/177 |
| 2004/0243998 A1 | 12/2004 | Collins et al. | |
| 2005/0055688 A1 | 3/2005 | Barajas et al. | |
| 2005/0132028 A1 | 6/2005 | Lester et al. | |
| 2005/0144617 A1 | 6/2005 | Chefalas et al. | |
| 2005/0198628 A1* | 9/2005 | Graham | G06F 8/64 717/174 |
| 2005/0283456 A1* | 12/2005 | Graham | G06F 11/1435 |
| 2005/0283636 A1 | 12/2005 | Vasudevan et al. | |
| 2006/0031434 A1* | 2/2006 | Tindal | H04L 41/0226 709/220 |
| 2006/0080656 A1 | 4/2006 | Cain et al. | |
| 2006/0095755 A1 | 5/2006 | Hanes et al. | |
| 2006/0173993 A1 | 8/2006 | Henseler et al. | |
| 2006/0239568 A1 | 10/2006 | Hanes et al. | |
| 2007/0038992 A1 | 2/2007 | Mahasintunan | |
| 2008/0007768 A1* | 1/2008 | Cho | G03G 15/5087 358/1.15 |
| 2008/0215711 A1 | 9/2008 | Shitrit | |
| 2010/0088194 A1* | 4/2010 | Sierer | G06Q 20/10 705/26.1 |

FOREIGN PATENT DOCUMENTS

| | | |
|---|---|---|
| WO | WO 99/63434 A1 | 12/1999 |
| WO | WO 01/44934 A1 | 6/2001 |

* cited by examiner

```
-<RequestJob GUID="XX" LOB="XX" JobID="XX" JobType="XX" MODEL="XX">
    <OS Name="XX" Path="XX"/>
    -<OSAPPS>
        <APP Name="XX" Path="XX"/>
    </OSAPPS>
    -<CUSTAPPS>
        <CAPPS Name="XX" Path="XX"/>
    </CUSTAPPS>
    -<OSSERVICEPACKS>
        <OSSP Name="XX" Path="XX"
        InstallCommand="XX"/>
    </OSSERVICEPACKS>
    -<OSPATCHES>
        <OSPATH Name="XX" Path="XX"
        InstallCommand="XX"/>
        <OSPATH Name="XX" Path="XX"
        InstallCommand="XX"/>
        <OSPATH Name="XX" Path="XX"
        InstallCommand="XX"/>
        <OSPATH Name="XX" Path="XX"
        InstallCommand="XX"/>
    </OSPATCHES>
    -<CustomConfig>
```

*Figure 2A*

```
<command type="XX" value="XX"/>
<command type="XX"
    value="XX="/>
<command type="XX"
    value="XX=="/>
<command type="XX"
    value="X+"/>
<command type="XX"
    value="XX="/>
<command type="XX"
    value="XX"/>
<command type ="XX"
    value="XX+"/>
<command type ="XX"
    value="XX="/>
</CustomConfig>
<Reg>XX==</Reg>
-<DeskTopSettings>
    <Background ImagePath="XX"/>
    </DeskTopSettings>
<RequestJob>
```

*Figure 2B*

SYSTEM AND METHOD FOR INFORMATION HANDLING SYSTEM IMAGE NETWORK COMMUNICATION

BACKGROUND OF THE INVENTION

1. Field of the Invention

The present invention relates in general to the field of information handling system manufacture, and more particularly to a system and method for information handling system image communication over a network to a manufacture location.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Businesses often order multiple numbers of information handling systems for manufacture with predetermined software configurations so that the information handling systems will arrive at the business ready for use. The software configurations generally include specified operating systems and applications as well as customization settings, such as hard disc drive partitions, network settings, application settings, user profiles and data, and even desktop settings. In some instances, businesses will prepare an image of a hard disc drive having the desired software configuration and will provide the image to the information handling system manufacturer for copying to manufactured information handling systems. The businesses will send the image to the information handling system manufacturer who, in turn, sends the image to various development and fulfillment centers for manufacture preparation. Once the business image is tested and prepared for promotion to the factory, the image is sent to the manufacture location for copying to manufactured information handling systems. The manufactured information handling systems are then sent to the business with the desired image ready to interact with the business' information technology environment.

One difficulty with the manufacture of information handling systems using customer images is that the images are generally large in size and thus take considerable time to transfer by network communication. For instance, a typical notebook information handling system image has multiple gigabytes of information and takes hours to communicate through networks to overseas manufacturing sites. Additional delays are often introduced by the initial communication of the image from the customer to the manufacturer and communication of the image within various manufacturer development and fulfillment centers for testing and manufacture preparation. Further, storage of images at various manufacture centers consumes considerable memory resources for the extended time period during which the images are communicated, tested and used. Overall, the manufacture of information handling systems with images provided by customers and communicated by networks through the manufacturer centers generally imposes relatively high storage, network and management costs, as well as decreased customer satisfaction due to delays in manufacture and delivery of ordered information handling systems.

SUMMARY OF THE INVENTION

Therefore a need has arisen for a system and method which more efficiently communicates information handling system images over networks for manufacture of information handling systems with an image.

In accordance with the present invention, a system and method are provided which substantially reduce the disadvantages and problems associated with previous methods and systems for manufacture of information handling systems with an image. An image is analyzed to identify a traits definition that allows re-creation of the image, and the traits definition is communicated over a network to a manufacture location. The traits definition is applied at the manufacture location to re-create the image for copying to an information handling system.

More specifically, an order site image analyzer accepts an image from a customer site and analyzes the image to identify the operating system, applications and unique information, such as registry settings and application forms and templates. An image decompressor decompresses the image for analysis by a settings engine, mapping engine and application engine that create an image traits definition XML file. For instance, the image traits definition has a schema with elements to identify the operating system including service packs and patches, the applications including forms and templates, registry settings including video resolution, network and power management settings, and other custom configuration information including hard disc drive partitions, computer name, local account, domain name, modem and desktop settings. The image traits definition is communicated by a network to a distal manufacture site image rebuilder that re-creates the image from an image component library and the unique information. The re-created image is then copied to manufactured information handling systems to ship to the customer that ordered the image. In one embodiment, the image analyzer resides at the customer site to create the image traits definition at the customer site for communication to the manufacturer, thus reducing customer use of network resources to communicate an image to a manufacturer for manufacture of an information handling system.

The present invention provides a number of important technical advantages. One example of an important technical advantage is that substantially less information is actually communicated in the transfer of an image traits definition than an entire image. The image traits definition essentially represents an image DNA that allows reproduction of a cloned image at the manufacture site with traits defined by an original image. An information handling system is built with the cloned image in substantially less time since the delays of communication of the entire image are not experienced. Further, overhead costs of network and storage capacity are substantially reduced due to the reduced size of the image traits definition compared against the size of the complete image. For example, a common portable information handling system image has a size of multiple gigabytes while the traits definition for that image has a size of around 20 kilobytes.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 2A and 2B (referred to herein as FIG. 2) depict an example of an XML schema for an image traits definition.

DETAILED DESCRIPTION

Manufacture of information handling systems with an image is performed with consumption of less network and memory resources by creating an image traits definition, communicating the traits definition to a distal manufacturing site and re-creating the image from the traits definition for copying to manufactured information handling systems. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
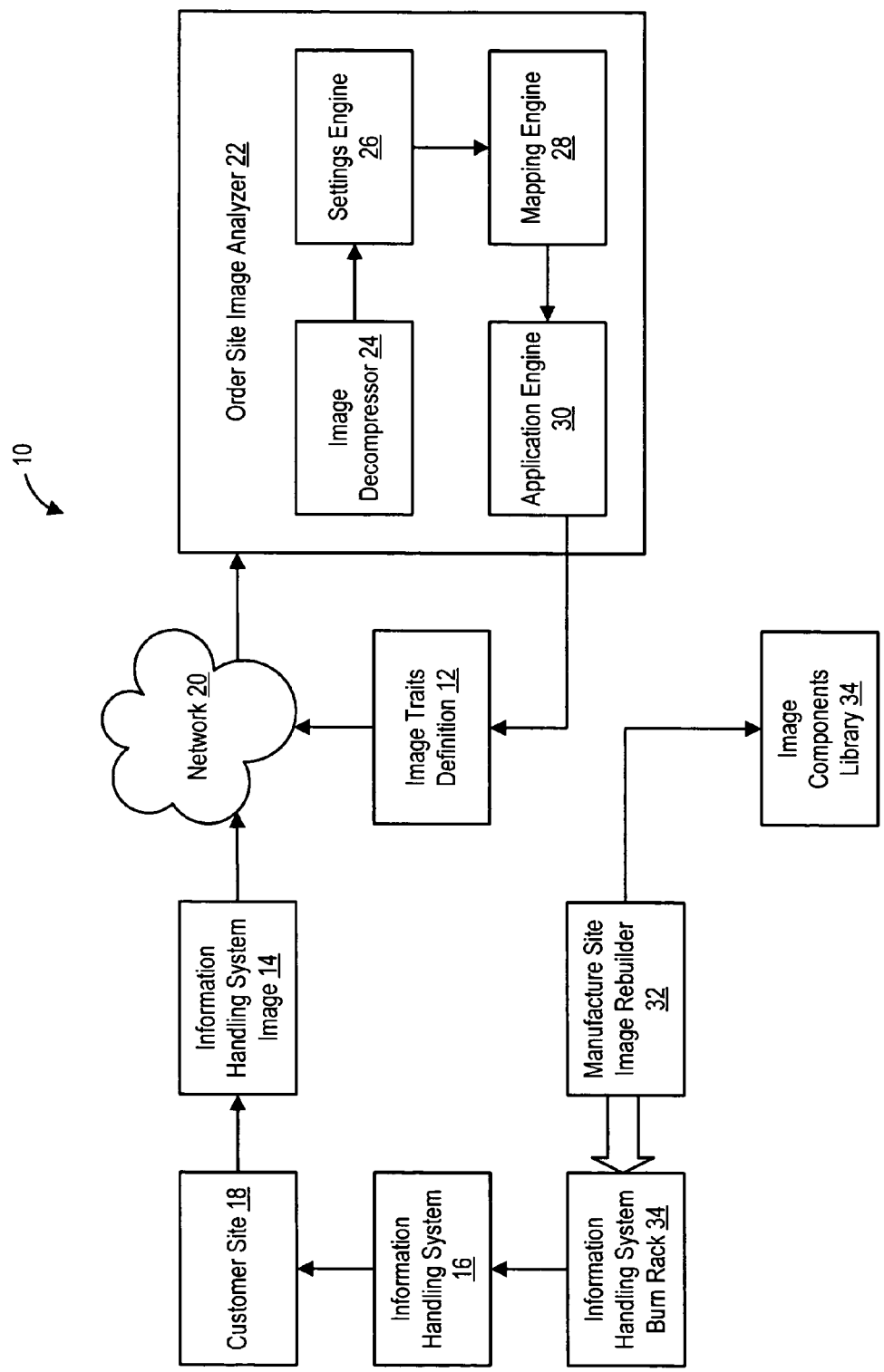
FIG. 1 depicts a block diagram of a system for creation of an image traits definition, communication of the traits definition to a distal location and re-creation of the image from the traits definition for manufacture of an information handling system.

Referring now to FIG. 1, a block diagram depicts a system 10 for creation of an image traits definition 12 from an information handling system image 14, communication of traits definition 12 to a distal location and re-creation of image 14 from traits definition 12 for manufacture of an information handling system 16. Information handling system image 14 is created by a customer at a customer site 18 to meet that customer's specific goals by including a desired operating system, desired applications and unique information. The unique information generally configures information handling system 16 to interact with customer site 18 in a desired manner and includes configuration information as well as forms and templates for the applications. The configuration information defines the operational parameters of information handling system 16, such as the hard disc drive partitions, power management and video resolution, the user profile such as the owner and computer name, the network settings such as the location, domain and modem settings, and the desktop settings. Typically, customers configure images for ordered information handling systems so that the systems as delivered by the manufacturer to customer site 18 are prepared to enter an operational state with little delay or customer site manipulation. Information handling system image 14 is then communicated by network 20, such as the Internet, to a manufacturer order site for testing and copying to manufactured information handling systems.

Customer images are accepted from network 20 by an order site image analyzer 22, which analyzes the images to identify the operating system, applications and unique information for creation of image traits definition 12. An image decompressor 24 decompresses the image to its installed form for analysis by a settings engine 26. Settings engine 26 determines the operating system and applications of the image and extracts the custom configuration information. For instance a registry template finds settings from the operating system registry, such as the video resolution, network and power management settings. A mapping engine 28 maps settings from any outdated configurations to up-to-date configurations. For instance, operating system upgrades, patches and service packs that alter registry settings from earlier operating system versions are mapped to the earlier versions so that image traits definition 12 will support an image having an updated operating system. An application engine 30 analyzes the decompressed image to identify unique information associated with applications, such as forms and templates. Order site image analyzer 22 then saves the identified information to an image traits definition having Extensible Markup Language (XML) schema such as that depicted by FIG. 2. The XML schema includes elements adequate to support re-creation of information handling system 14, such as the operating system name, the customer applications, the operating system service packs and patches, custom configuration information and desktop settings.

Once order site image analyzer 22 creates image traits definition XML file 12, image traits definition 12 is sent through network 20, such as the Internet, to a manufacture site image rebuilder 32. Manufacture site image rebuilder 32 reads the attributes from the XML schema of image traits definition 12 to re-create information handling system 14. The software components for the image re-creation, such as the operating system and applications, are called from an image components library 34 and populated with the custom configuration and other unique information of image traits definition 12. The re-created image is then provided to an information handling system burn rack 34 for copying to manufactured information handling system 16. By identifying the "DNA" of the image, image traits definition 12 substantially reduces the amount of information that is communicated in order to transfer an image 14 across a network 20. In alternative embodiments, image analyzer 22 may be located at customer site 18 so that the customer communicates the image traits definition 12 to order information handling systems having image 14. In such an embodiment, the manufacturer distributes image rebuilder 32 at the various manufacturer sites that use the full image, such as for testing.

Figure 3:
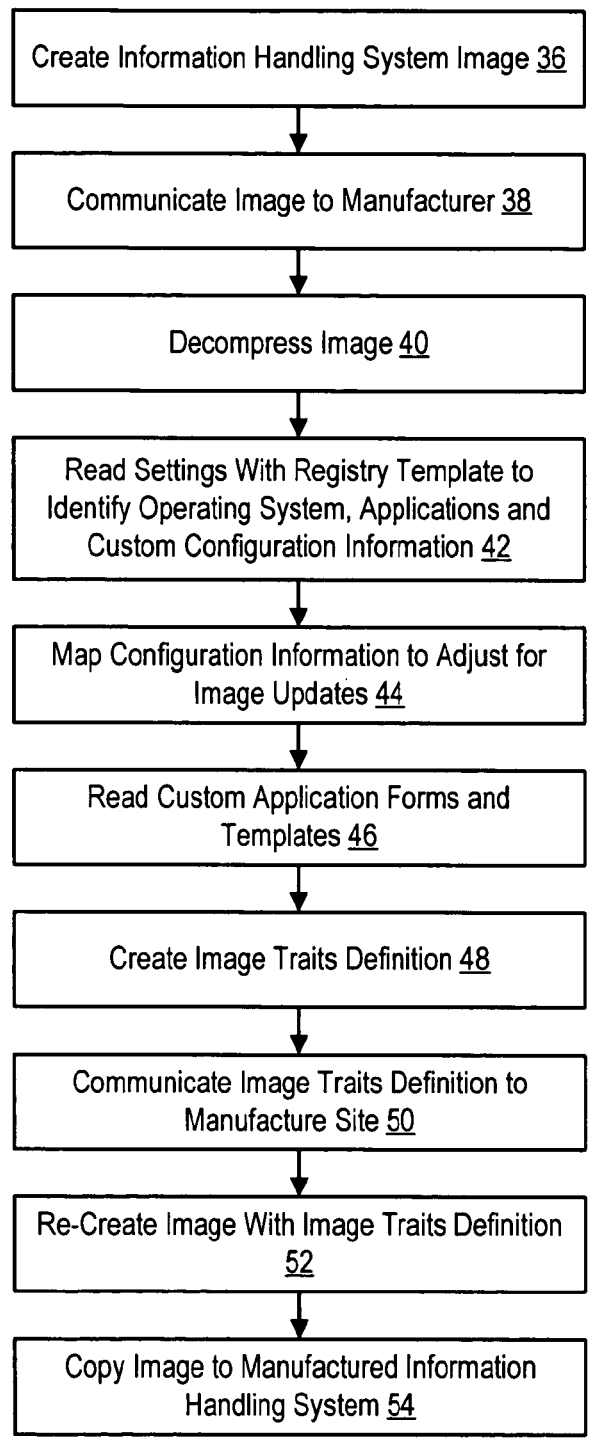
FIG. 3 depicts a flow diagram of a process for manufacture of an information handling system with an image traits definition.

Referring now to FIG. 3, a flow diagram depicts a process for manufacture of an information handling system with an image traits definition. The process begins at step 36 with creation of an information handling system image. At step 38, the image is communicated to a manufacturer for copying to an ordered information handling system. At step 40, the image is decompressed so that, at step 42, the settings are read with a registry template to identify the operating system, applications and custom configuration information of the image. At step 44, the information is mapped to adjust for any updates to the operating system and, at step 46, custom application information, such as forms and templates are read. At step 48, an image traits definition is created from the identified information to have adequate description of the image for subsequent re-creation of the image. At step 50, the image traits definition is communicated across a network, such as the Internet, to a manufacture site. At step 52, the image is recreated from the image traits definition and an image component library at the manufacture site so that the image mirrors the original image communicated to the manufacturer. At step 54, the re-created image is copied to manufactured information handling systems for shipment to the customer that defined the image.

Although the present invention has been described in detail, it should be understood that various changes, substitutions and alterations can be made hereto without departing from the spirit and scope of the invention as defined by the appended claims.

What is claimed is:

1. A system for manufacture of information handling systems, the system comprising:
    an image analyzer stored in non-transitory memory operable to execute on a processor to generate an image traits definition from an information handling system image and to store the image traits definition in storage, the image traits definition having software characteristics and customization settings of the image defined in a manner to allow re-creation of the image;
    a remote image rebuilder stored in non-transitory memory and operable to execute on a processor, the remote image rebuilder distal to and interfaced with the storage through a network, the remote image rebuilder operable to apply the image traits definition to an image components library to re-create the image; and
    an information handling system burn rack proximate to the image rebuilder and operable to copy the re-created image to a manufactured information handling system.

2. The system of claim 1 wherein the image analyzer comprises:
    an image decompressor operable to decompress the image;
    a settings engine operable to determine customization settings of the decompressed image and to store the settings in the image traits definition; and
    an application engine operable to determine the software characteristics and to store the software characteristics in the image traits definition.

3. The system of claim 2 wherein customization settings comprise video resolution, network and power management settings.

4. The system of claim 2 wherein software characteristics comprise application names, application templates, application forms and application settings.

5. The system of claim 1 wherein the image traits definition is an XML file having a schema with plural elements.

6. The system of claim 5 wherein the elements comprise an operating system, application, operating system update, custom configuration and desktop setting elements.

7. The system of claim 1 wherein the image analyzer is proximate an information handling system manufacturer order site operable to receive images from customers.

8. The system of claim 1 wherein the image analyzer is proximate an information handling system customer order site operable to communicate an information handling system order to a manufacturer.

9. A method for manufacture of an information handling system having an image, the method comprising:
    storing an image in storage, the image having an operating system, plural applications and unique information for copying to an information handling system;
    creating an image traits definition from the stored image, the image traits definition identifying the operating system, plural applications and unique information to support recreation of the image;
    communicating the image traits definition over a network to an information handling system manufacture site;
    re-creating the image from the image traits definition and a component library having the operating system and plural applications; and
    manufacturing information handling systems at the information handling system manufacture site by loading the image to the information handling systems.

10. The method of claim 9 wherein storing an image further comprises creating the image at a customer site and creating an image traits definition further comprises analyzing the image to create the image traits definition at a manufacturer order site.

11. The method of claim 10 further comprising shipping the manufactured information handling system to the customer site.

12. The method of claim 9 wherein storing an image further comprises creating the image a customer site and creating an image traits definition further comprises analyzing the image to create the image traits definition at the customer site.

13. The method of claim 12 further comprising:
    communicating the image traits definition from the customer site to a manufacturer order site;
    re-creating the image at the manufacturer order site; and
    testing the re-created image before communicating the image traits definition to the manufacture site.

14. The method of claim 9 wherein the image traits definition is an XML file.

15. The method of claim 9 wherein the unique information comprises configuration settings and application templates and forms.

16. The method of claim 15 wherein the configuration settings comprise hard disc drive partitions, the operating system, applications, user profile information, video resolution, power management and network settings.

17. The method of claim 9 wherein the network comprises the Internet.

18. A method for manufacture of an information handling system with an image, the method comprising:
    analyzing the image to create an image traits definition XML file, the image traits definition identifying the image operating system, applications and unique settings;
    communicating the image traits definition over a network to a manufacture site through a network;

re-creating the image at the manufacture site with the image traits definition and a library of image components selected by reference to the image traits definition; and copying the re-created image to an information handling system.

19. The method of claim 18 wherein the analyzing further comprises comparing a registry template with the registry of the image to determine at least some of the unique settings.

20. The method of claim 19 wherein analyzing further comprises determining templates and forms associated with at least one image application and storing the templates and forms as unique settings.

\* \* \* \* \*